United States Patent
Tran

(10) Patent No.: US 8,967,302 B2
(45) Date of Patent: Mar. 3, 2015

(54) VEHICLE AIR TURBINE

(76) Inventor: Don Tran, El Monte, CA (US)

(*) Notice: Subject to any disclaimer, the term of this patent is extended or adjusted under 35 U.S.C. 154(b) by 301 days.

(21) Appl. No.: 13/210,597

(22) Filed: Aug. 16, 2011

(65) Prior Publication Data

US 2013/0043082 A1 Feb. 21, 2013

(51) Int. Cl.
*B60K 16/00* (2006.01)

(52) U.S. Cl.
CPC .......... *B60K 16/00* (2013.01); *B60K 2016/006* (2013.01); *B60Y 2200/14* (2013.01); *B60Y 2200/145* (2013.01); *Y02T 10/90* (2013.01)
USPC .......................................................... 180/2.2

(58) Field of Classification Search
USPC .......................................................... 180/2.2
See application file for complete search history.

(56) References Cited

U.S. PATENT DOCUMENTS

| | | | | |
|---|---|---|---|---|
| 3,556,239 A * | 1/1971 | Spahn | ................ | 180/65.25 |
| 3,713,503 A * | 1/1973 | Haan | ................ | 180/2.2 |
| 3,876,925 A * | 4/1975 | Stoeckert | ................ | 322/1 |
| 3,878,913 A * | 4/1975 | Lionts et al. | ................ | 180/2.2 |
| 4,002,218 A * | 1/1977 | Horvat | ................ | 180/2.2 |
| 4,019,828 A * | 4/1977 | Bunzer | ................ | 416/55 |
| 4,075,545 A * | 2/1978 | Haberer | ................ | 322/35 |
| 4,093,035 A * | 6/1978 | Fletcher | ................ | 180/2.2 |
| 4,134,469 A * | 1/1979 | Davis | ................ | 180/2.2 |
| 4,168,759 A * | 9/1979 | Hull et al. | ................ | 180/2.2 |
| 4,179,007 A * | 12/1979 | Howe | ................ | 180/2.2 |
| 4,254,843 A * | 3/1981 | Han et al. | ................ | 180/165 |
| 4,423,368 A * | 12/1983 | Bussiere | ................ | 322/35 |
| 5,038,049 A * | 8/1991 | Kato | ................ | 290/55 |
| 5,265,435 A * | 11/1993 | Richardson | ................ | 62/133 |
| 5,280,827 A * | 1/1994 | Taylor et al. | ................ | 180/165 |
| 5,287,004 A * | 2/1994 | Finley | ................ | 290/55 |
| 5,296,746 A * | 3/1994 | Burkhardt | ................ | 290/55 |
| 5,386,146 A * | 1/1995 | Hickey | ................ | 290/55 |
| 5,680,032 A * | 10/1997 | Pena | ................ | 290/52 |
| 6,138,781 A * | 10/2000 | Hakala | ................ | 180/2.2 |
| 6,700,215 B2 * | 3/2004 | Wu | ................ | 290/44 |
| 6,838,782 B2 * | 1/2005 | Vu | ................ | 290/55 |
| 6,857,492 B1 * | 2/2005 | Liskey et al. | ................ | 180/165 |
| 6,897,575 B1 * | 5/2005 | Yu | ................ | 290/44 |
| 6,926,346 B1 * | 8/2005 | Wong et al. | ................ | 296/180.5 |
| 7,135,786 B1 * | 11/2006 | Deets | ................ | 290/55 |
| 7,347,485 B1 * | 3/2008 | Saunders | ................ | 296/180.5 |
| 7,398,841 B2 * | 7/2008 | Kaufman | ................ | 180/2.2 |
| 7,434,636 B2 * | 10/2008 | Sutherland | ................ | 180/2.2 |
| 7,445,064 B2 * | 11/2008 | Kim | ................ | 180/2.2 |
| 7,808,121 B1 * | 10/2010 | Glynn | ................ | 290/55 |
| 7,810,589 B2 * | 10/2010 | Frierman | ................ | 180/2.2 |
| 7,854,278 B2 * | 12/2010 | Kaufman | ................ | 180/2.2 |
| 8,098,040 B1 * | 1/2012 | Botto | ................ | 320/101 |
| 8,162,589 B2 * | 4/2012 | Moore | ................ | 415/4.2 |
| 8,253,262 B1 * | 8/2012 | Kiler | ................ | 290/44 |
| 8,274,169 B2 * | 9/2012 | Schopf | ................ | 290/55 |
| 8,513,828 B1 * | 8/2013 | Ripley | ................ | 290/50 |
| 2002/0153178 A1 * | 10/2002 | Limonius | ................ | 180/2.2 |
| 2013/0043082 A1 * | 2/2013 | Tran | ................ | 180/2.2 |

* cited by examiner

*Primary Examiner* — Jeffrey J Restifo
(74) *Attorney, Agent, or Firm* — Clement Cheng

(57) ABSTRACT

A vehicle air turbine has a vehicle body and an air turbine assembly includes an air turbine blade mounted on a turbine frame. The turbine frame is mounted on a rotating axle, and the rotating axle is mounted to the vehicle body. An air inlet is mounted in front of the air turbine with an air outlet behind the air turbine. A front wing is connected to a wing frame to form an airfoil for directing air through the turbine. The front wing is movable relative to the wing frame, and the airfoil is inverted to draw air into the air inlet. A turbine inlet deflector directs air flow towards a turbine inlet portion. A generator can be mounted to the rotating axle for generating electricity.

9 Claims, 6 Drawing Sheets

VEHICLE AIR TURBINE

FIELD OF THE INVENTION

The present invention is in the field of vehicle mounted air turbines.

DISCUSSION OF RELATED ART

A variety of different air turbines have been made for vehicle applications with many different configurations. For example, in United States patent publication 2008/0315827 by Massey published Dec. 25, 2008, the disclosure of which is incorporated herein by reference, describes an air turbine mounted on a vehicle that can be used for charging batteries. Massey, U.S. patent application Ser. No. 11/786,407 provides for paddle wheel type assembly having a plurality of rectangular turbine blades. Vehicle mounted helical airfoil wind turbines have a wide variety of different styles and shapes, as described in Sullivan United States patent publication US 2011/0081243 published Apr. 7, 2011, the disclosure of which is incorporated herein by reference.

Vehicle mounted air turbines can be mounted in a wide variety of different locations. Spahn in U.S. Pat. No. 3,556,239 provides for an electrically driven vehicle using an internally mounted air turbine where the turbine deep within the car. Vehicle mounted air turbines have also been mounted on wheels such as in Sarwin United States patent publication 2010/0026009 published Feb. 4, 2010.

A variety of different vehicle mounted air turbines have a scoop for directing airflow. For example, Boodman in U.S. Pat. No. 4,314,160 issued Feb. 2, 1982, the disclosure of which is incorporated herein by reference, provides for a large air scoop to receive coming air. Ellis in United States patent publication 2007/0163829 published Jul. 19, 2007, also provides for an air scoop. Venturi airflow is described in Nyffenger United States patent publication 2010/0207389 published Aug. 19, 2010.

Vertical axis vehicle mounted air turbines have also been popular. Bradley in United States patent publication 2007/0107949, published May 17, 2007, the disclosure of which is incorporated herein by reference, provides for an air power energy transformation using vertically mounted wind turbines mounted in an air gap or behind the trailer on a semi truck. Another vertical axis vehicle mounted air turbine is Dornan in United States patent publication 2010/0244453 published Sep. 30, 2010, the disclosure of which is incorporated herein by reference, provides for a vertical wind turbine having a helical blade configuration. Kulde shows a vertical mounted air turbine located in the front of the vehicle and United States patent publication 2010/0001531 published Jan. 7, 2010.

Some vehicle mounted air turbines are simply windmills mounted on cars. The vertical axis wind turbine of Stoeckert in U.S. Pat. No. 3,876,925 issued Apr. 8, 1975 provides for a wind turbine mounted on top of vehicle having a wind vane so that it can act as a windmill when the vehicle is at rest. Sutherland in U.S. Pat. No. 7,474,636 provides for a windmill with a post and vane that is pivotally mounted so that it can be flipped out from a compartment underneath the hood.

Bradley describes in U.S. patent application Ser. No. 11/273,291 that the air turbines are propeller type members having a wind turbine and electrical generator in combination mounted on an extension pole with wires extending into the vehicle. Yu in U.S. Pat. No. 6,897,575 issued May 24, 2005, the disclosure of which is incorporated herein by reference, shows an induction motor connection with the vehicle mounted air turbine.

The vehicle mounted air turbine has been known to power a wide variety of different appliances and apparatus. An air turbine can further be powered by a compression with fuel so as to supplement power to an engine such as described in Dravis U.S. Pat. No. 7,763,988 issued Jul. 27, 2010. An air turbine can also be mounted for powering refrigeration on the vehicle as described by Richardson in U.S. Pat. No. 5,265,435 filed Dec. 31, 1992. Pena in U.S. Pat. No. 5,680,032 issued Oct. 21, 1997, the disclosure of which is incorporated herein by reference, provides a wind powered battery charging system to use the wind power to drive an alternator. Socolove in United States patent publication 2010/0237627 published Sep. 23, 2010 provides for a hydrogen generator powered by a vehicle mounted wind turbine.

In United States patent publication to Vu publication number 2004/0084908 published May 6, 2004 a wind energy capturing device for moving vehicles includes a wind turbine connected to a generator and battery formed as a generator module mounted on the top surface of a vehicle. Vu later issued as U.S. Pat. No. 6,838,782 on Jan. 4, 2005, the disclosure of which is corporate herein by reference. Vu describes a rotary turbine with a small wind deflector protruding at a 45° angle from the top of the rotary turbine.

The references of the prior art also include references and discussion of other prior art. For example, Glynn in U.S. Pat. No. 7,808,121 issued Oct. 5, 2010, the disclosure of which is incorporated herein by reference, provides an car having a pair of propeller type air turbines pointed in the direction of flow of the vehicle travel. Glynn teaches air braking and also the use of a gate to control airflow to the turbines. The Glynn reference further describes a variety of related art in the field including: United States patent publication number 2008/0283319 to Putnam; United States patent publication number 2007/0189899 to Serpa; United States patent publication number 2003/0231000 to Teo; United States patent publication number 2003/0132638 Simonsen; U.S. Pat. No. 7,347,485 to Saunders; U.S. Pat. No. 6,926,346 B1 to Wong; United States patent number to Yu; U.S. Pat. No. 6,838,782 to Vu; U.S. Pat. No. 5,038,049 to Kato; U.S. Pat. No. 4,168,759 to Hull; U.S. Pat. No. 3,876,925 to Stoeckert; U.S. Pat. No. 3,556,239 to Spahn.

SUMMARY OF THE INVENTION

A vehicle air turbine has a vehicle body and an air turbine assembly includes an air turbine blade mounted on a turbine frame. The turbine frame is mounted on a rotating axle, and the rotating axle is mounted to the vehicle body. An air inlet is mounted in front of the air turbine with an air outlet behind the air turbine. A front wing is connected to a wing frame to form an airfoil for directing air through the turbine. The front wing is movable relative to the wing frame, and the airfoil is inverted to draw air into the air inlet. A turbine inlet deflector directs air flow towards a turbine inlet portion. A generator can be mounted to the rotating axle for generating electricity.

A wing controller can be mechanically connected to the front wing. A rear wing is preferably mounted on the wing frame at a rear wing hinge. A front wing hinge connects the front wing to the wing frame, and the front wing has a front wing tip that bends outward. A front wing cable connection is connected to a front wing cable, and the front wing cable is connected to a wing cable. The front wing cable controls the position of the front wing.

A rear wing is connected to the wing frame at a rear wing hinge. A rear wing cable connection is formed on a rear wing and receives a connection to a rear wing cable. A front wing coiled spring is mounted in a front wing spring hinge, and the front coiled spring biases the front wing to a front wing closed position from a front wing airfoil position. A rear wing coiled spring is mounted in a rear wing spring hinge, and the rear coiled spring biases the rear wing to a rear wing closed position from a rear wing airfoil position. A front concave can be formed on the front wing. The front wing has a concave profile so that the front wing bends upward. A rear concave is formed on the rear wing, and the rear wing has a concave profile so that the rear wing bends upward. The front and rear concave cooperate for forming the airfoil.

Figure 1:
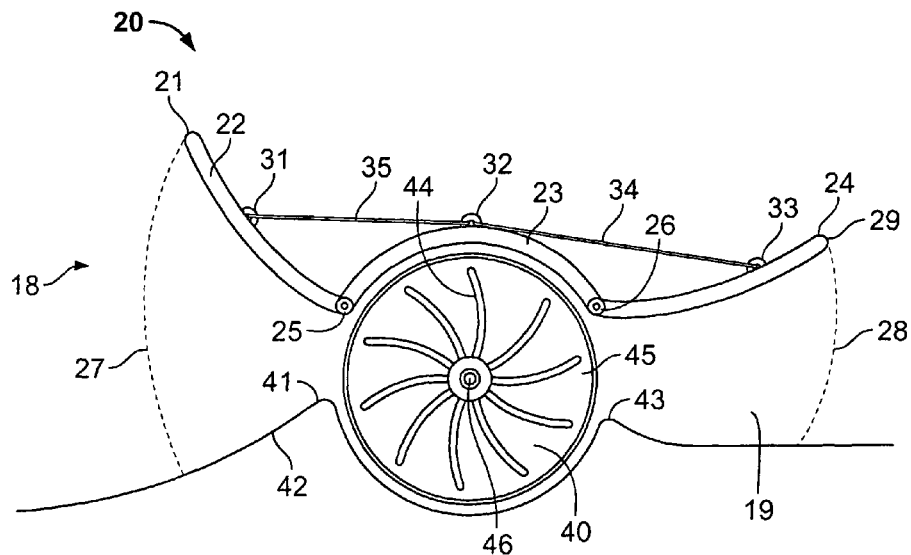
FIG. 1 is a cross-section diagram of the vehicle air turbine.
Figure 2:
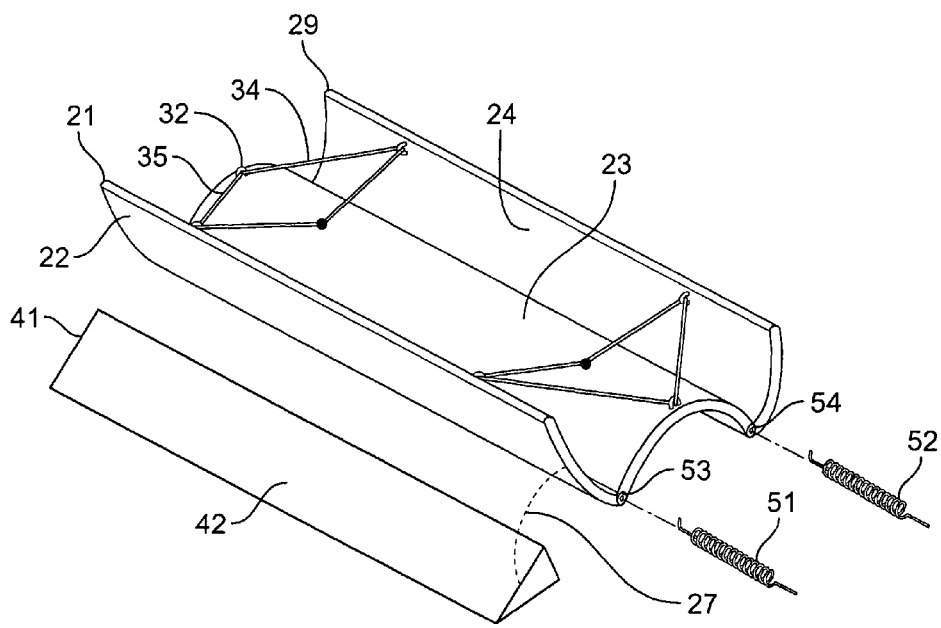
FIG. 2 is a perspective view of the preferred embodiment.
Figure 3:
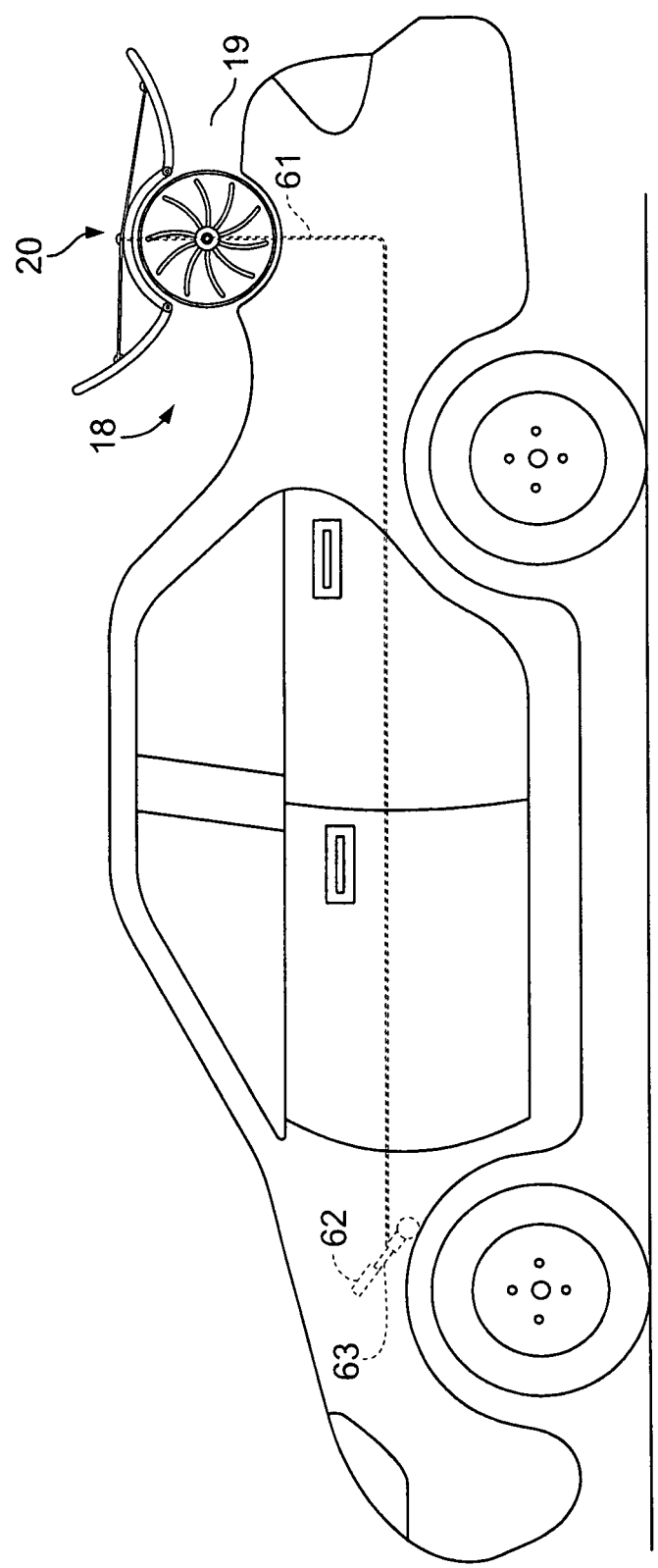
FIG. 3 is a cross-section diagram of the vehicle air turbine located at a rear of the vehicle.
Figure 4:
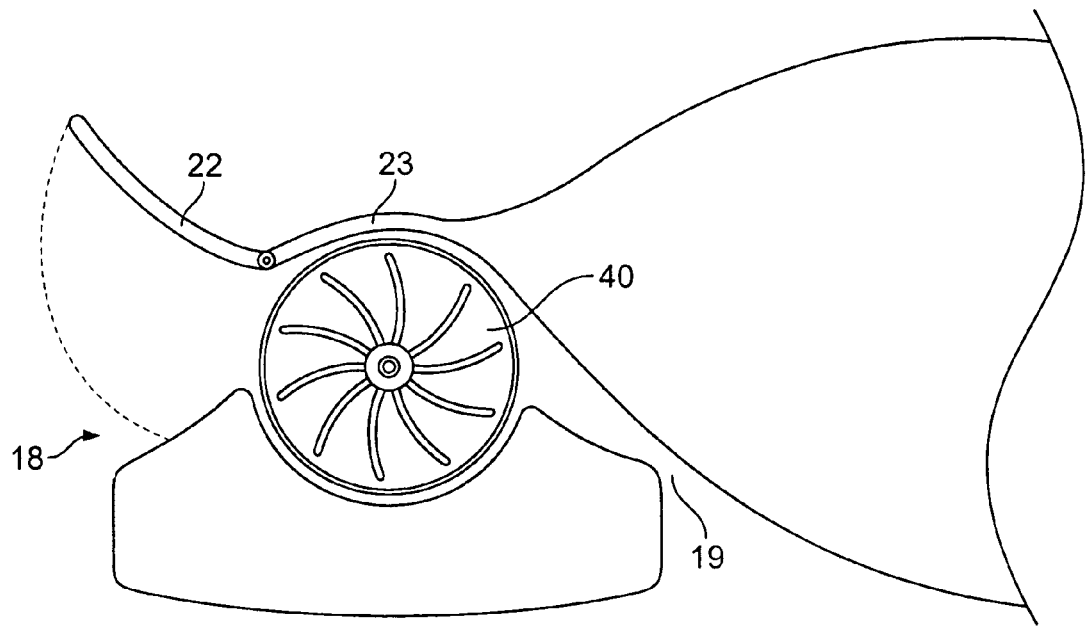
FIG. 4 is a cross-section diagram of the vehicle air turbine located at a front of the vehicle.
Figure 5:
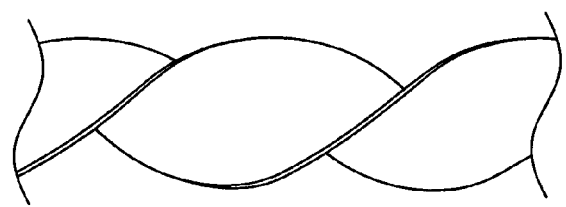
FIG. 5 is a diagram of a helical turbine blade.
Figure 6:
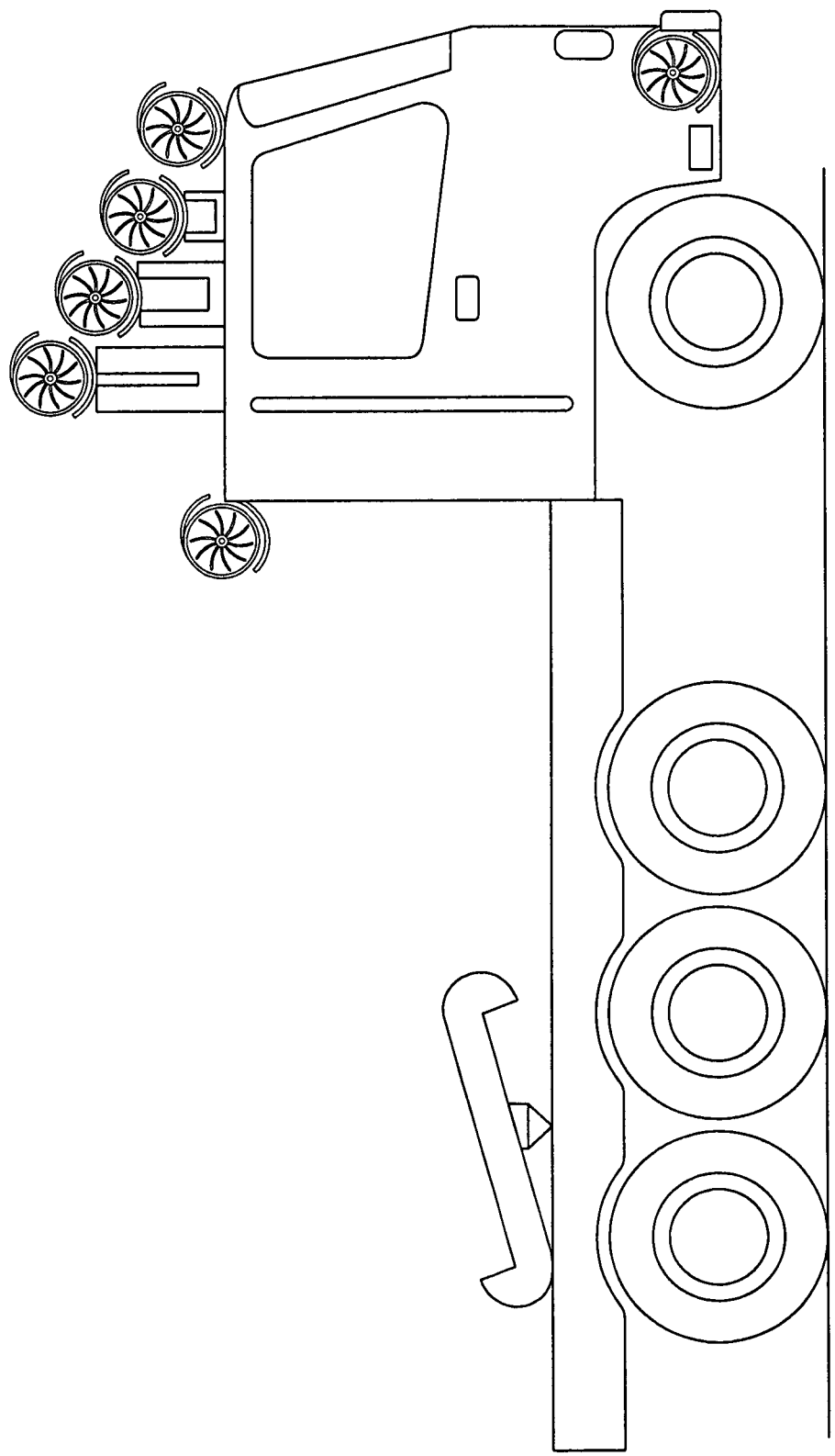
FIG. 6 is a diagram of a present invention mounted on a truck.
Figure 7:
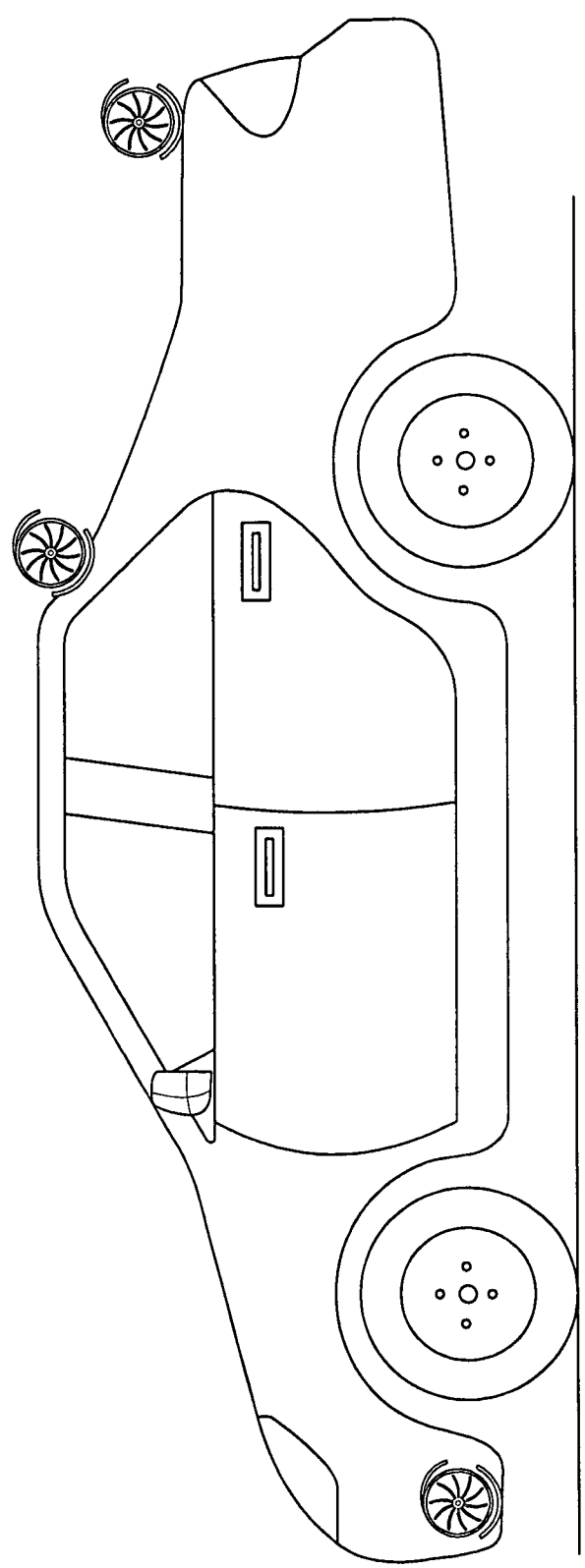
FIG. 7 is a diagram of a present invention mounted on a car.
Figure 8:
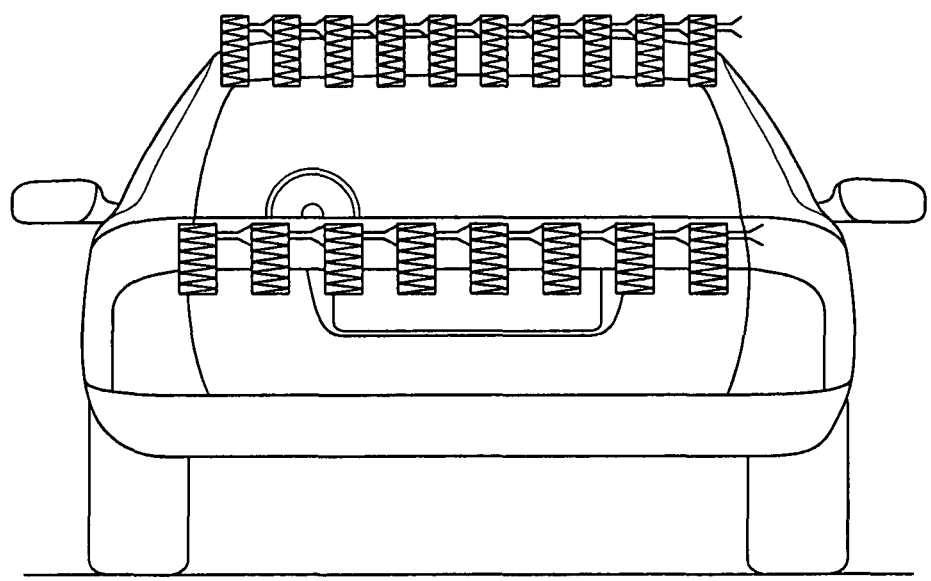
FIG. 8 is a diagram of a present invention mounted on a car.

The following call a list of elements is useful for referencing the elements of the drawings.
18 Air Intake
19 Air Outlet
20 Wing Assembly
21 Forward Wing Tip
22 Front Wing
23 Wing Frame
24 Rear Wing
25 Front Wing Hinge
26 Rear Wing Hinge
27 Front Wing Tip Travel Path
28 Rear Wing Tip Travel Path
29 Rear Wing Tip
31 Front Wing Cable Connection
32 Wing Frame Cable Connection
33 Rear Wing Cable Connection
34 Rear Wing Cable
35 Front Wing Cable
40 Turbine
41 Turbine Inlet Tip
42 Turbine Inlet Deflector
43 Turbine Outlet Tip
44 Turbine Blade
45 Turbine Frame
46 Turbine Axle
51 Front Wing Coiled Spring
52 Rear Wing Coiled Spring
53 Front Wing Spring Hinge
54 Rear Wing Spring Hinge
61 Wing Cable
62 Wing Controller Pedal
63 Wing Controller Pedal Mount

DETAILED DESCRIPTION OF THE PREFERRED EMBODIMENT

The present invention includes a flexible semi rigid movable wing that scoops air into a turbine. The wing acts as an air diverter and is preferably movable and may be flexible or articulating.

The present invention is a vehicle air turbine that receives air into an air intake 18 and an air outlet 19. The air flow is directed by an airfoil on a wing assembly 20. The front wing 22 and the wing frame 23 and the rear wing 24 form an airfoil for directing air through a turbine 40.

The airfoil can be modified and shaped by changing the wing assembly so that the forward wingtip 21 of the front wing 22 directs air downward along a front wing 22. The front wing can be made as a flap movable at a front wing hinge 25. The front wing hinge 25 can be moved by a front wing cable connection 31. The cable connection is preferably connected to a front wing cable 35. The front wing cable 35 can be connected to a rear wing cable 34 so that both are connected to a wing cable 61. The front wing 22 is connected to the wing frame 23 at the front wing hinge 25.

Similarly, the rear wing 24 can be connected to the wing frame 23 at a rear wing hinge 26. The rear wing cable connection 33 can receive a connection to a rear wing cable 34 which can be passed through a wing frame cable connection 32. The wing frame cable connection 32 can be formed as an eyelet to receive the rear wing cable 34 and connect it with a wing frame cable.

The front wing hinge 25 can be biased into a closed position by a front wing coiled spring 51 mounted in a front wing spring hinge 53. The front wing hinge 25 can be integrated with the front wing spring hinge 53 so that the front wing spring hinge 53 is coaxial with the front wing hinge 25. The rear wing coiled spring 52 can be mounted within the rear wing spring hinge 54 to provide a closed biasing force. The rear wing spring hinge 54 can be integrated into the rear wing hinge 26 and can be coaxial to the rear wing hinge 26.

In a closed position, the front wing hinge 25 allows the front wing tip to travel downward and close the air intake when the forward wingtip 21 meets with the vehicle body. The front wing tip 21 can therefore travel in a front wing tip travel path 27.

The rear wing hinge 26 is preferably loaded with a rear wing spring such that the rear wing spring hinge 54 has a closed position where the rear wing tip 29 travels along a rear wing tip travel path 28 when the rear wing tip 29 meets with the vehicle body. The rear wing closed position closes the air outlet so that air does not flow through the turbine 40.

The front wing preferably has a profile which is concave so that the front wing bends upward. The rear wing also preferably has a profile which is concave so that it also bends upward. The combination of the upward bend of the front wing and, the upward bend of the rear wing provides an inverted airfoil having a net downward force in laminar flow.

The vehicle body preferably includes a turbine inlet tip 41 to direct air toward the turbine inlet portion. The turbine inlet tip 41 is formed at the end of a turbine inlet deflector 42. The turbine inlet deflector 42 pushes incoming air toward the airfoil and toward the turbine blades 44. The vehicle body also preferably includes a turbine outlet tip 43 which extends outward from the vehicle body and also directs air exiting from the turbine.

A wing controller can be implemented for controlling the motion of the wings and coordinating the motion of the wings with the behavior of the vehicle. A wing controller can be a pedal. The wing cable 61 can connect to both of the wing cables, namely the front wing cable and the rear wing cable so that retracting the wing cable 61 pulls open both wings into an open position to form the airfoil. The wing cable 61 can be mechanically or electronically connected to a wing controller pedal 62 which is mounted on a wing controller pedal mount 63. The wing controller pedal 62 can be mechanically or electrically connected to a braking system such as a brake pedal. The wing controller pedal 62 can also be the brake pedal. The wing controller pedal 62 can be an independent pedal to allow independent control of the wing cable 61. The wing controller pedal 62 can be a brake pedal which could be used to control a spoiler on a vehicle such as a car so that deceleration from disc brakes on the wheels can be combined with drag of the turbine and an inverted airfoil spoiler to provide customizable vehicle control.

Including a generator mounted to the turbine axle 46 can provide charging for a vehicle battery such as an auxiliary battery, or a battery for driving the vehicle. The turbine 40 can be made with a number of turbine blades 44 mounted laterally on a pair of frames 45. The end frames 45 can be formed as disks sandwiching or enclosing the turbine blades 44. Alternatively, the turbine blade can be formed as a helical turbine blade having a single or multiple twisted turbine blade.

The invention claimed is:

1. A vehicle air turbine comprising:
   a. a vehicle body;
   b. an air turbine assembly including an air turbine blade mounted on a turbine frame, wherein the turbine frame is mounted on a rotating axle, wherein the rotating axle is mounted to the vehicle body;
   c. an air inlet in front of the air turbine;
   d. an air outlet behind the air turbine;
   e. a front wing connected to a wing frame to form an airfoil for directing air through the turbine, wherein the front wing is movable relative to the wing frame, wherein the airfoil is inverted to draw air into the air inlet; and a rear wing mounted on the wing frame at a rear wing hinge.

2. The vehicle air turbine of claim 1, further comprising: a rear wing cable connection formed on a rear wing and receiving a connection to a rear wing cable.

3. The vehicle air turbine of claim 1, further comprising: a front wing coiled spring mounted in a front wing spring hinge, wherein the front coiled spring biases the front wing to a front wing closed position from a front wing airfoil position.

4. The vehicle air turbine of claim 1, further comprising: a rear wing coiled spring mounted in the rear wing spring hinge, wherein the rear coiled spring biases the rear wing to a rear wing closed position from a rear wing airfoil position.

5. The vehicle air turbine of claim 1, further comprising:
   a turbine inlet deflector directing air flow towards a turbine inlet portion;
   a generator mounted to the rotating axle for generating electricity; and
   a wing controller mechanically connected to the front wing.

6. A vehicle air turbine comprising:
   a. a vehicle body;
   b. an air turbine assembly including an air turbine blade mounted on a turbine frame, wherein the turbine frame is mounted on a rotating axle, wherein the rotating axle is mounted to the vehicle body;
   c. an air inlet in front of the air turbine;
   d. an air outlet behind the air turbine;
   e. a front wing connected to a wing frame to form an airfoil for directing air through the turbine, wherein the front wing is movable relative to the wing frame, wherein the airfoil is inverted to draw air into the air inlet; and a front concave formed on the front wing, wherein the front wing has a profile which is concave so that the front wing bends upward.

7. The vehicle air turbine of claim 6, further comprising:
   a turbine inlet deflector directing air flow towards a turbine inlet portion;
   a generator mounted to the rotating axle for generating electricity; and
   a wing controller mechanically connected to the front wing.

8. A vehicle air turbine comprising:
   a. a vehicle body;
   b. an air turbine assembly including an air turbine blade mounted on a turbine frame, wherein the turbine frame is mounted on a rotating axle, wherein the rotating axle is mounted to the vehicle body;
   c. an air inlet in front of the air turbine;
   d. an air outlet behind the air turbine;
   e. a front wing connected to a wing frame to form an airfoil for directing air through the turbine, wherein the front wing is movable relative to the wing frame, wherein the airfoil is inverted to draw air into the air inlet; and a rear concave formed on the rear wing, wherein the rear wing has a profile which is concave so that the rear wing bends upward.

9. The vehicle air turbine of claim 8, further comprising:
   a turbine inlet deflector directing air flow towards a turbine inlet portion;
   a generator mounted to the rotating axle for generating electricity; and
   a wing controller mechanically connected to the front wing.

\* \* \* \* \*